United States Patent
Ou

(10) Patent No.: US 6,947,219 B1
(45) Date of Patent: Sep. 20, 2005

(54) FOCUS ADJUSTABLE HEAD MOUNTED DISPLAY SYSTEM FOR DISPLAYING DIGITAL CONTENTS AND DEVICE FOR REALIZING THE SYSTEM

(75) Inventor: Shu-Fong Ou, Taipei Hsien (TW)

(73) Assignee: Universal vision biotechnology Co., Ltd., Taipei (TW)

( * ) Notice: Subject to any disclaimer, the term of this patent is extended or adjusted under 35 U.S.C. 154(b) by 18 days.

(21) Appl. No.: 10/858,453

(22) Filed: Jun. 2, 2004

(51) Int. Cl.[7] .......................... G02B 27/14; G09G 5/00
(52) U.S. Cl. .......................... 359/630; 351/158; 345/7
(58) Field of Search ........ 359/630; 351/158; 345/7–9; 349/5–7

(56) References Cited

U.S. PATENT DOCUMENTS

| | | | |
|---|---|---|---|
| 6,369,952 B1 * | 4/2002 | Rallison et al. | 359/630 |
| 6,580,448 B1 * | 6/2003 | Stuttler | 348/46 |
| 6,611,385 B2 * | 8/2003 | Song | 359/630 |
| 2002/0085843 A1 * | 7/2002 | Mann | 396/374 |
| 2002/0130821 A1 * | 9/2002 | Bronson | 345/8 |

* cited by examiner

Primary Examiner—Huy Mai

(57) ABSTRACT

A focus adjustable head mounted display system used in a head mounted display device for displaying digital contents comprising: a digital content storage unit for storing digital data including audio data and image data; an signal processing unit for receiving image signals from the digital content storage unit and processing the received image signals; a focus adjustment unit for adjusting an input image from the digital content storage unit according an input focus adjustment signal so that the adjusted display image responses the focus adjustment signal; an image display unit installed at a head mounted display device for displaying the adjusted display image; a focus input unit being a manually operation device for generating a focus adjustment signal to the signal processing unit; and the focus input unit providing a focus value to the focus adjustment software. A head mounted display device for realizing the focus adjustable head mounted display system is also disclosed.

30 Claims, 10 Drawing Sheets

FOCUS ADJUSTABLE HEAD MOUNTED DISPLAY SYSTEM FOR DISPLAYING DIGITAL CONTENTS AND DEVICE FOR REALIZING THE SYSTEM

FIELD OF THE INVENTION

The present invention relates to head mounted displays, and particular to a focus adjustable head mounted display system for displaying digital contents and a device for realizing the system, which provide focus adjustment for the image displayed on the screens of the head mounted display.

BACKGROUND OF THE INVENTION

In U.S. Pat. No. 6,369,952, a visual display device is provided for delivering a generated image, preferably combinable with environment light, to the eye of a user. A shroud protects from stray light and holds optical elements in desired alignment. An image generator is masked by at least two masks to provide for a high quality image without waste. A removably mounted shield or activatable device and convert the apparatus from a see-through device to an immersion device and back again. The device can be mounted to the user's head while still allowing for use of conventional eyeglasses. A tracker for outputting an indication of the orientation, attitude and/or position of a head-mounted display (HMD) may be provided. The tracker can be configured so that it is incorporated in the HMD housing and/or can be easily decoupled from the HMD, so that the HMD can be used without the tracker (e.g. for watching movies).

In U.S. Pat. No. 6,611,385, a wearable display system including a display panel to display a signal processed in a predetermined way. The wearable display system includes a grating to diffract a signal output from the display panel, a waveguide to guide the propagation of a signal diffracted by the grating; and a magnifying lens to magnify the signal propagating through the waveguide and to direct the signal toward an eye of a user. The waveguide is formed by a combination of two or more substrates. According to the wearable display system, optical devices are easily and simply arranged on the waveguide to conform to specifications, and furthermore, are individually manufactured and attached to the waveguide. Therefore, the wearable display system is manufactured with minimum time and effort.

In U.S. Pat. No. 5,991,084, a compact virtual image display system is provided, which includes a microdisplay; a first magnification optic consisting of three surfaces: a display input surface; a reflective/transmissive surface, and a reflective first magnification element surface; and a second magnification optic. Light forming the source object enters the first magnification optic at the display input surface. The light travels within the first magnification optic such that it is projected to an area on the reflective backslash transmissive surface that is at least partially within the full field of view provided by the second magnification optic. The light is directed to the reflective/transmissive surface at a first angle relative to the reflective/transmissive surface such that the light is internally reflected by the reflective/transmissive surface and directed to the reflective first magnification element surface. The first magnification element surface internally reflects the light corresponding to the source object as a magnified virtual image. The magnified virtual image is then is conveyed within the first magnification optic back to the reflective/transmissive surface at a second angle of incidence relative to the reflective/transmissive surface such that the light is transmitted by the reflective/transmissive surface out of the first magnification optic. The second magnification optic is positioned to receive the magnified virtual image transmitted from the first magnification optic and transmit a compound magnified virtual image of the magnified virtual image of the source object to the observer.

In U.S. Pat. No. 6,683,584, a camera display system displays information via a matrix display element mounted within a housing that is positioned relative to at least eye of a user. The display is connected to a video or image sensor such that the user can view information or images shown on the display. The display can be mounted to a housing so that the user can move the display in and out of the user's field of view.

In U.S. Pat. No. 6,680,802, a one-eye viewing type head-mounted image display device that is compact and comfortably wearable consists mainly of a viewer and an elastic member. The viewer includes an LCD, a main prism, a see-through prism, a frame, and a microphone. The main prism conducts an image, which is displayed on the LCD, to make the image viewable with either the user's right eye or left eye. The see-through prism is bonded to the main prism, transmits extraneously light, and conducts the light to a users eye. The frame bears the LCD at a predetermined position relative to the prisms. The microphone is mounted in the frame. The elastic member includes a nose rest which supports the viewer so that the viewer will be located at a predetermined position in front of the user's eye.

However, all above mentioned prior arts only disclose optical systems or mechanic structures for displaying image to the head mounted display, but no prior art discusses or discloses any structure or mechanism about the image quality to the eyes. Many people have eye diseases, such as far-sightedness (hyperopia), nearsightedness (shortsightedness; myopia), weak sight (amblyopia), or astigmatism, which cannot see clear views for normal images. Thereby, as a normally clean image is displayed on a head mounted unit, the image is vague to the eye-diseased user. This is because it is not imaged in the focus of the user. For example, the image of a nearsighted people is focused before the retina so that the people will see a vague image. For example, nearsighted people must wear a pair of eyeglasses to adjust the image clearness to make the image is just imaged on the retina. However, this problem is also occurred for the people wearing a head mounted display since in general, the user wearing a head mounted display can not further wear a pair of glasses. Thus, it is necessary that the image displayed on the head mounted display can provide images suitable for the eyes of the user. Thus it is necessary to that the images displayed on the head mount display is adjusted in advance so that as the image is incident in to the eyes it present a clear image on the retina of the user's eyes.

Moreover, a further application is that a head mounted display can be used to completely replace the function of eyeglasses, especially, for patients of weak sights. That, images are captured through a camera and then the images are processed in advance so as to display on the display screen which can present clear images to the user. Thereby, it is necessary to process the captured images in advance. However, all the prior arts cannot provide these functions to users.

SUMMARY OF THE INVENTION

Accordingly, the primary object of the present invention is to provide a focus adjustable head mounted display system and the method and device for realizing the system, which provide focus adjustment for the image displayed on the screens of the head mounted display.

To achieve above objects, the present invention provides A focus adjustable head mounted display system used in a head mounted display device for displaying digital contents comprising: a digital content storage unit for storing digital data including audio data and image data; an signal processing unit connected to the digital content storage unit for receiving image signals outputted from the digital content storage unit and processing the received image signals; a focus adjustment unit included in the signal processing unit for adjusting an input image from the digital content storage unit according an input focus adjustment signal to generate an adjusted display image so that the adjusted display image responses the focus adjustment signal; an image display unit connected to the signal processing unit; the image display unit being installed at a head mounted display device for displaying the adjusted display image which is directly viewed by at least one eye of a user wearing the head mounted display; and a focus input unit connected to the focus adjustment unit; focus input unit being a manually operation device for generating the focus adjustment signal to the signal processing unit; the focus input unit providing a focus value to the focus adjustment unit.

Moreover, the present invention provides a head mounted display device which can realize above mentioned system. The various objects and advantages of the present invention will be more readily understood from the following detailed description when read in conjunction with the appended drawing.

DETAILED DESCRIPTION OF THE INVENTION

In order that those skilled in the art can further understand the present invention, a description will be described in the following in details. However, these descriptions and the appended drawings are only used to cause those skilled in the art to understand the objects, features, and characteristics of the present invention, but not to be used to confine the scope and spirit of the present invention defined in the appended claims.

Figure 1A:
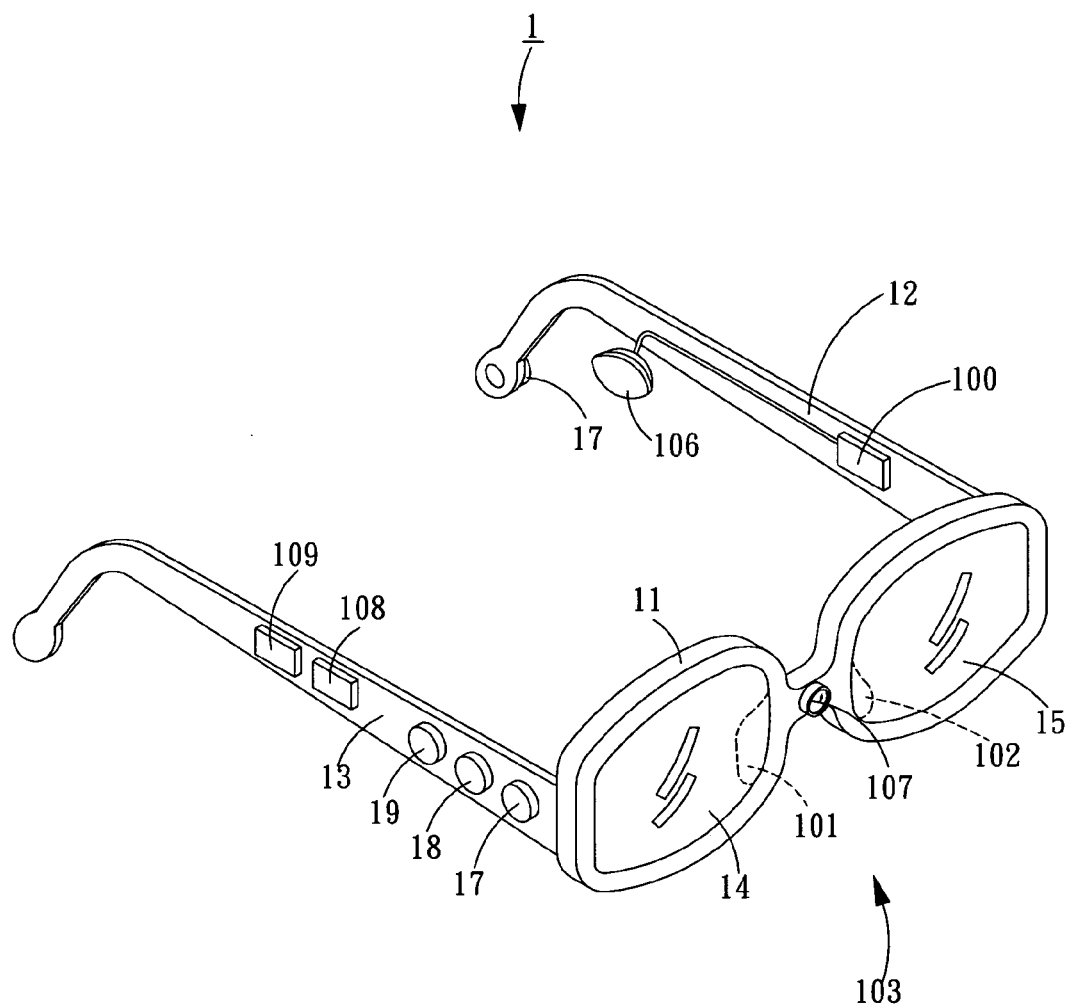
FIGS. 1A, 1B and 1C show the different views of head mounted display device of the present invention.
Figure 1B:
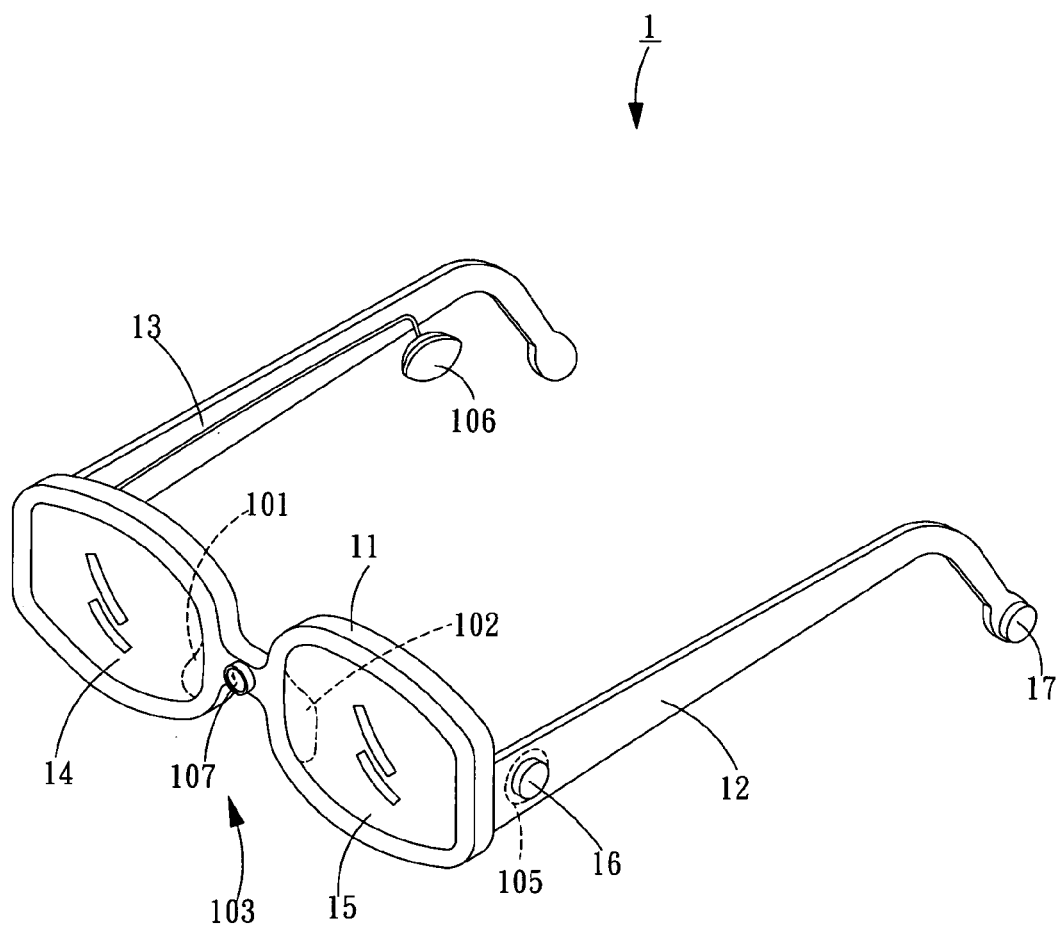
Figure 1C:
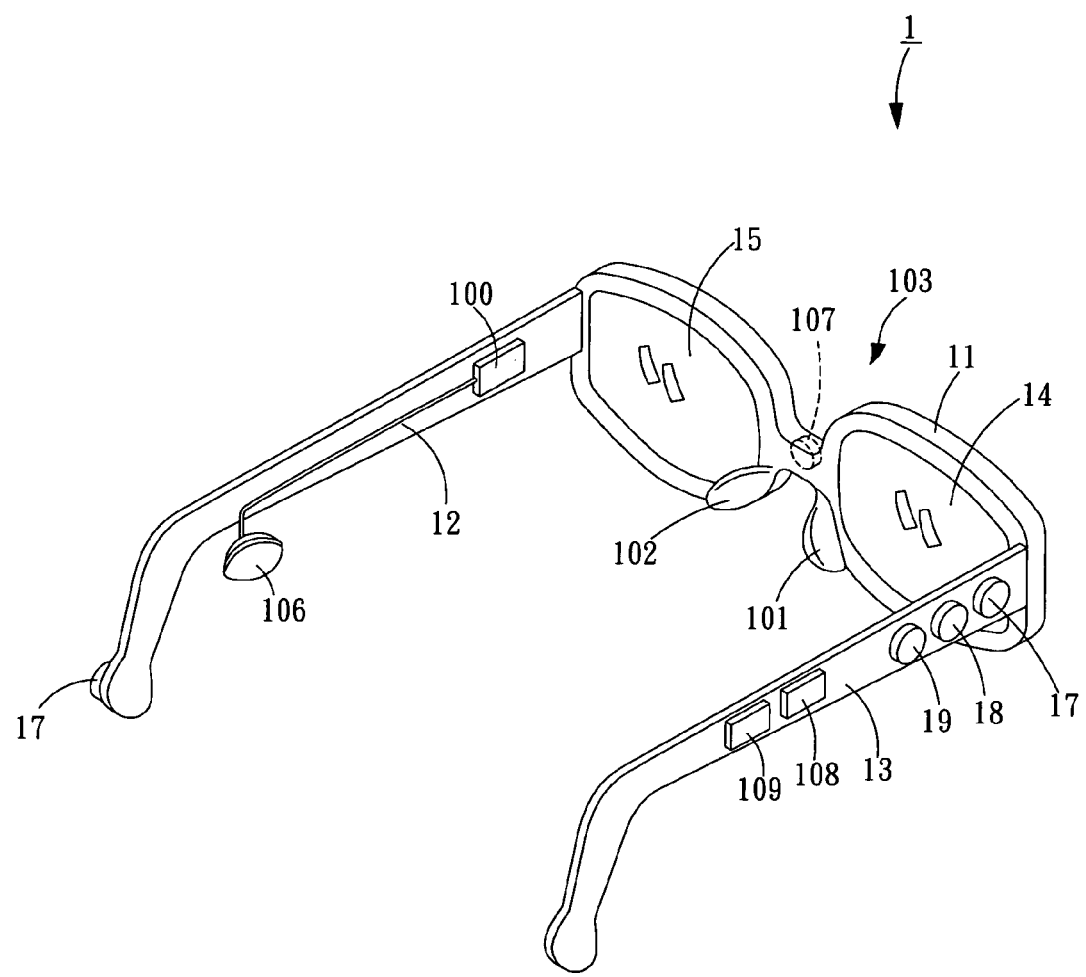

As depicted in FIGS. 1A, 1B and 1C, one embodiment about a head mounted display device 1 is displayed. The head mounted display device 1 can be realized by a pair of eyeglasses, as illustrated in the drawings. The eyeglasses include a casing 11 and two temple pieces 12, and 13. The main components of the focus adjustable head mounted display system according to the present invention are mainly hidden in the casing. The casing 11 has two display screens 14, and 15 corresponding to the two eyes of the user wearing the eyeglasses.

Figure 8:
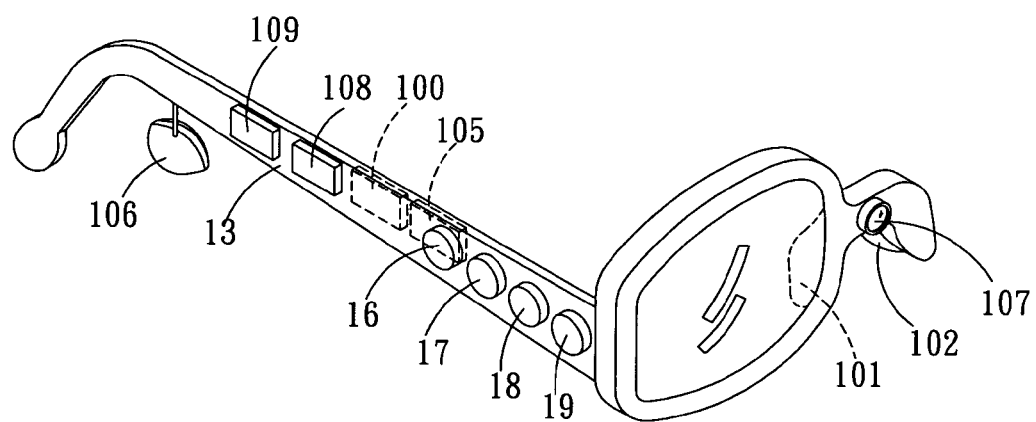
FIG. 8 shows a one-displaying structure of the present invention.

However, in the present invention, there may be only one lens and one temple piece being used in the head mounted display device, as illustrated in FIG. 8. All these are within the scope and spirit of the present invention.

Figure 2:
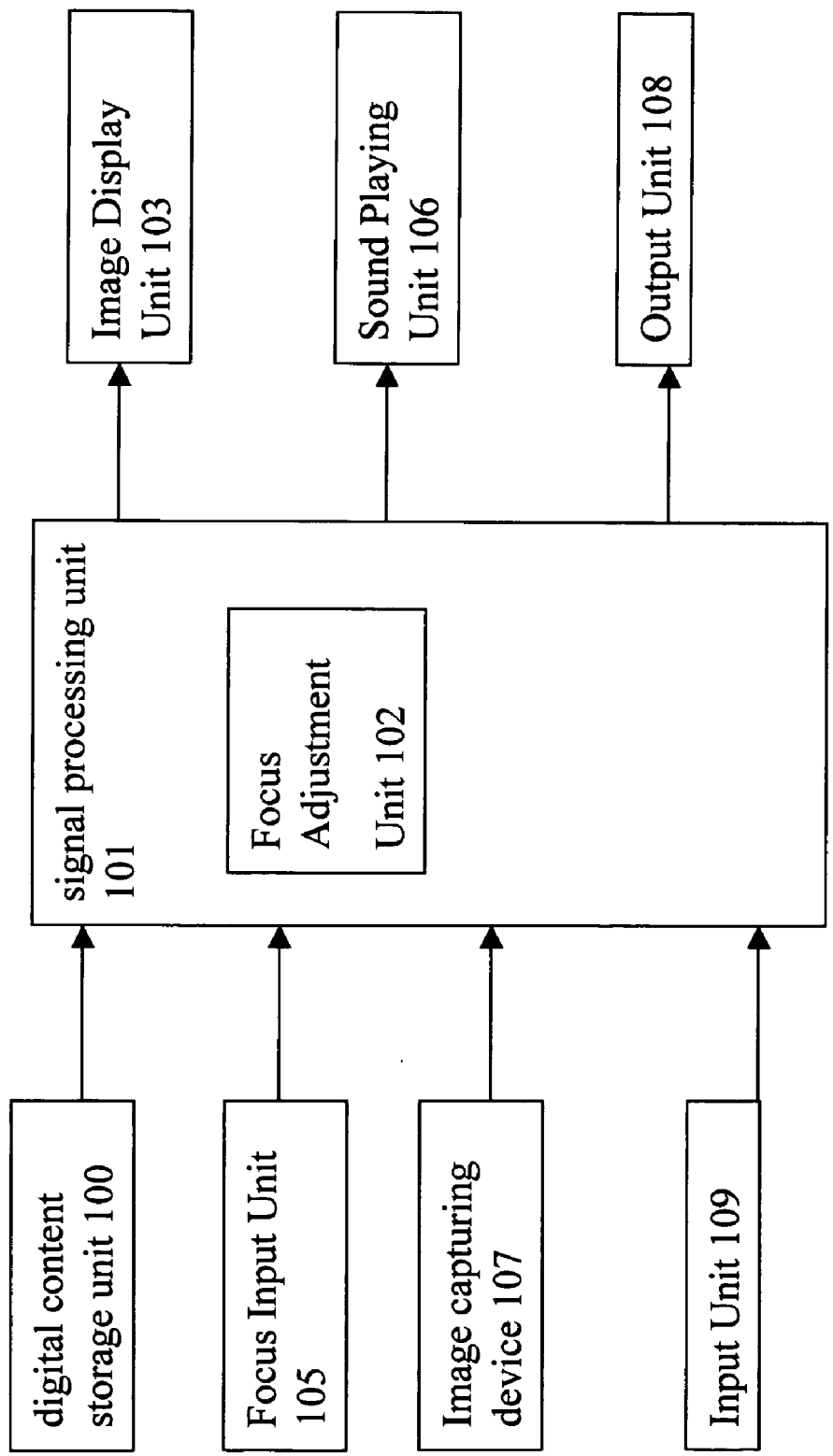
FIG. 2 is a block diagram about the focus adjustable head mounted display system of the present invention.
Figure 3:
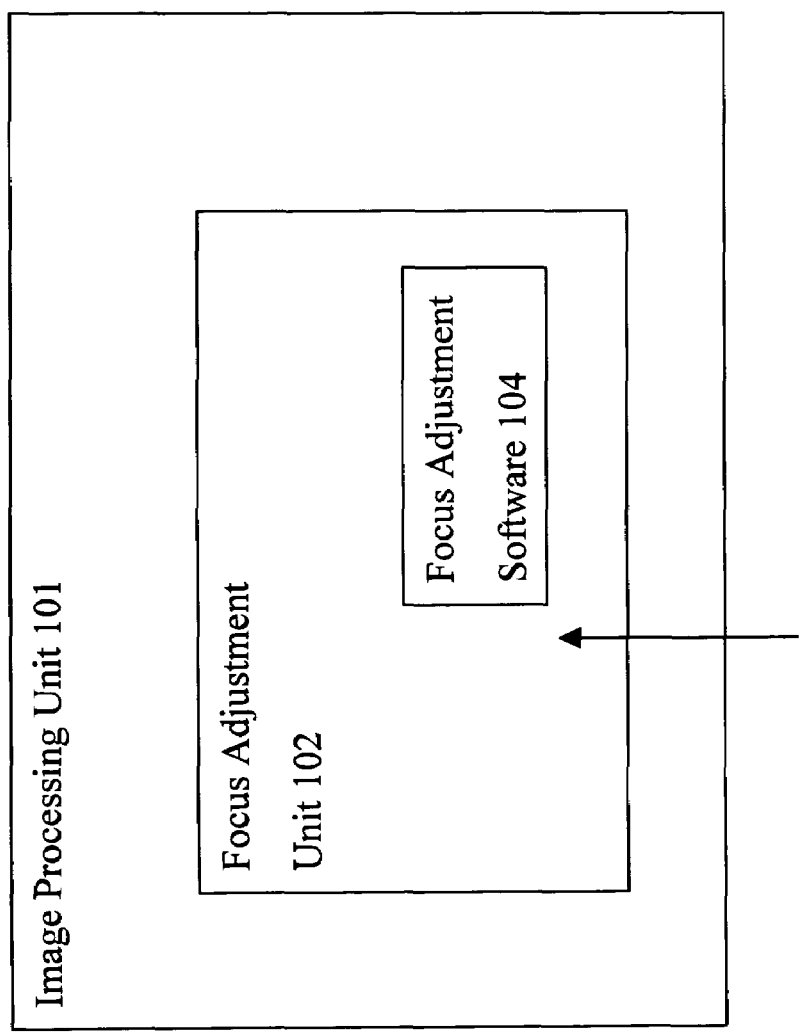
FIG. 3 is a block diagram about the components of the signal processing unit of the present invention.

With reference to FIGS. 2 and 3, the system block diagram about the focus adjustable head mounted display system of the present invention is illustrated. The system includes an digital content storage unit 100, an signal processing unit 101, a focus adjustment unit 102 and an image display unit 103.

The digital content storage unit 100 is a memory, such as DRAM, SRAM, Flash memory, etc. for storing digital data, such as movies, songs, books, letters, short messages, web pages, notes, programs, etc. The signal processing unit 101 is connected to the digital content storage unit 100 for receiving image signals from the digital content storage unit 100 and then processing the received signals including image signals and non-image signals.

The focus adjustment unit 102 is included in the signal processing unit 101 for adjusting an input image from the digital content storage unit 100 according an input focus adjustment signal 20 so that the adjusted display image responses the focus adjustment signal 20.

Figure 4:
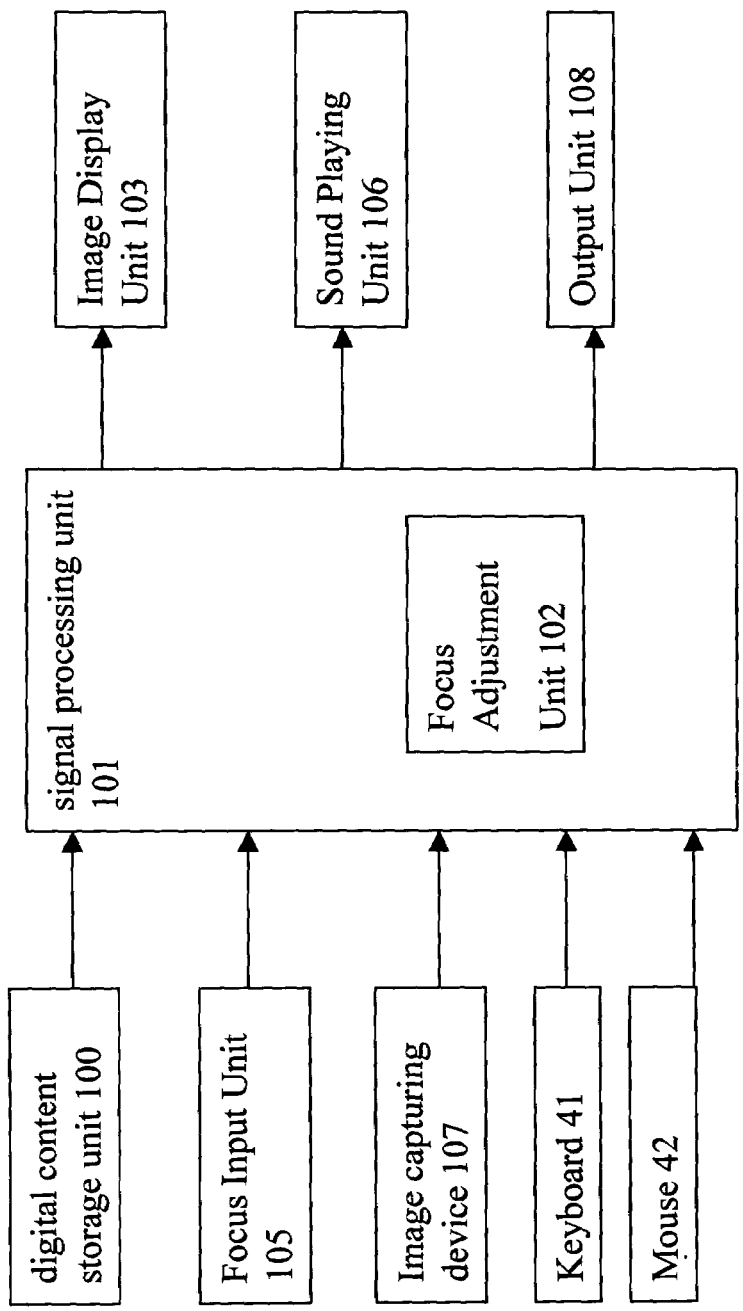
FIG. 4 shows the embodiment about the input unit of the present invention.

A focus adjustment software 104 is installed in the focus adjustment unit 102, see FIG. 4. The focus adjustment software 104 operates the input image so as to get the adjusted display image mapping to the input image with a designated focus from the focus adjustment signal 20.

The image display unit 103 is connected to the signal processing unit 101. The image display unit 103 is installed the head mounted display device for displaying the adjusted display image which is directly viewed by at least one eye of a user wearing the head mounted display.

A focus input unit 105 connected to the focus adjustment unit 102. The focus input unit 105 is a manually device. The user can adjust the focus input unit 105 so as to generate the focus adjustment signal 20 to the signal processing unit 101. The focus input unit 105 provides a focus to the focus adjustment software 104.

A sound playing unit 106 is connected to the signal processing unit 101 for emitting sound, wherein the sound playing unit may be a microphone or one or a pair of earphone.

In some embodiments, it is useful to provide the user with controls. It is possible to provide controls which are not mounted on the head-mounted device (such as a remote control unit or a console) in the depicted embodiment. In the depicted embodiment, a button 16 is used to actuate the image focus adjustment signal 20 which give different focus values according to an input from the button 16. A button 17 is used to provide, for example, a mute function. Preferably, activation of this button provides for discontinuing display of the video image which is currently being output. Preferably, the mute control is configured so that the user can easily turn off at least the image, without requiring turning off of power to the HMD or interrupting the stream of data (although, in one embodiment, the mute button can be configured to simultaneously pause the data stream, such as by sending an interrupt command or other signal to a PC via the serial port). Moreover, a sound adjusting button 18 can be inclued in the present invention for adjusting the volume and other sound adjusting function.

Furthermore, a power actuation button 19 is provided for actuating the focus adjustable head mounted display system.

In operation, the user can adjust the button 16 to affect the focus input unit 105 to generate the focus adjustment signal 20 to the focus adjustment unit 102 so as to generate an adjusted display image. However, as the user finds that the adjusted display image is not clear. The user can further adjust the button 16 so as to generate another adjusted display image.

Referring to FIG. 1 again, in the embodiment of the present invention, the digital content storage unit 100, for example, a camera, is installed, preferably, in the center of the two display screen 14, 15 so as to capturing an image near a normal human view. The signal processing unit 101 is installed at the upper side of one lens, however, in the present invention, the signal processing unit 101 may be placed anywhere, for example, on the temple pieces 12, 13. Even the signal processing unit 101 is a separable piece separated from the eyeglasses. It is positioned not confined by those illustrated in the drawings.

The image display unit 103 may be a projecting type display unit, namely, the display image is generated and then is projected into the display screen 14, 15 so as to get a virtual image viewed by the user. Or the image display unit 103 is a direct display unit. Namely, the image is directly input to the lenses so as to present to the user. Further, the first button 16 is installed at one upper edge of one display screen 14 and the second button 17 is installed at one upper edge of another lenses 15. However, the positions of the first and second buttons 16, 17, 18, and 19 are not confined by those depicted in FIG. 1. They can be arranged in other place of the eyeglasses. All these are within the scope and spirit of the present invention.

In the present invention, other functions can be added. Referring to FIG. 2, the present invention can comprises an input unit 109, for example, in FIG. 4, it is illustrated that the input device 109 is a keyboard 41 or a mouse 42 for inputting data or selecting required items. Thereby, the display screens 14, 15 are used as terminals of a computer and the signal processing unit 101 is used as a CPU of a computer. Therefore, the present invention is used as a micro-comtpuer.

Figure 5:
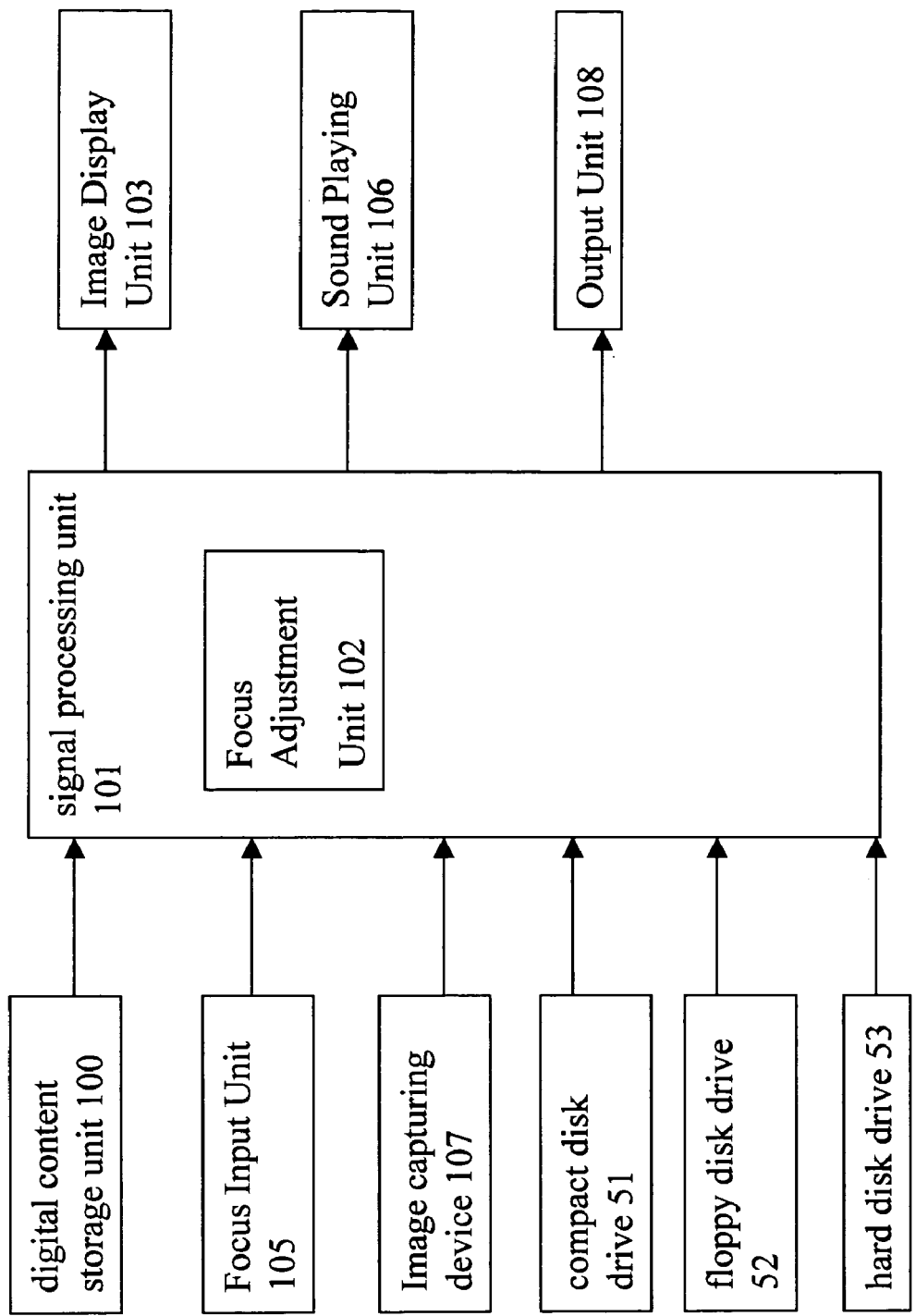
FIG. 5 shows another embodiment about the input unit of the present invention.

In another embodiment, as illustrated in FIG. 5, the input unit 109 is used as a compact disk drive 51 (such as a CDR or a DVD compact disk drive), or a floppy disk drive 52, or a hard disk drive 53 for storage data into the signal processing unit 101 for being displayed in the display screens 14, 15 now or future. Thereby, the contents of the input unit 109 is connected to the digital content storage unit 100 for being stored.

Figure 6:
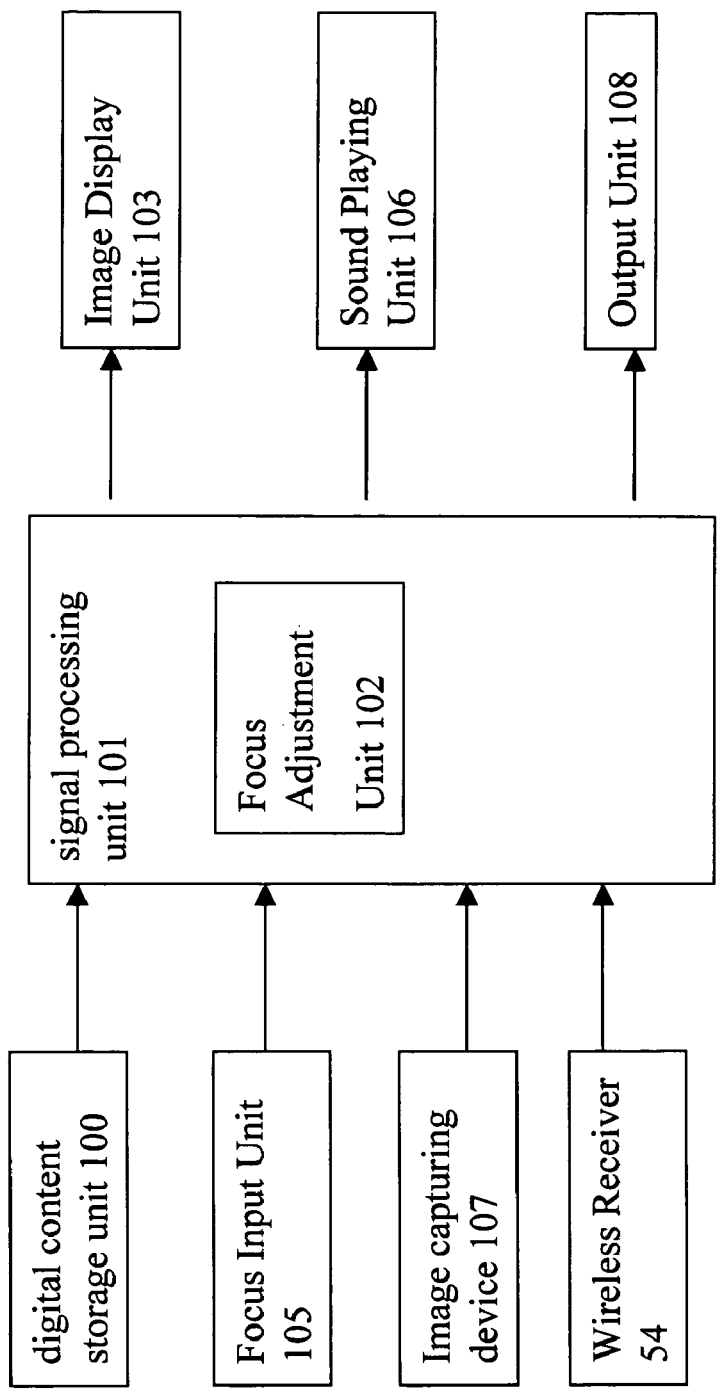
FIG. 6 shows a further embodiment about the input unit of the present invention.

Moreover, referring to FIG. 6, the input devices 109 of the present invention can be a wireless receiver 54.

With reference to FIG. 2, the present invention further comprises an image capturing device 107 for capturing environmental images. When the image is captured and is then inputted to the signal processing unit 101. It is displayed on the display screens 14, 15.

Figure 7:
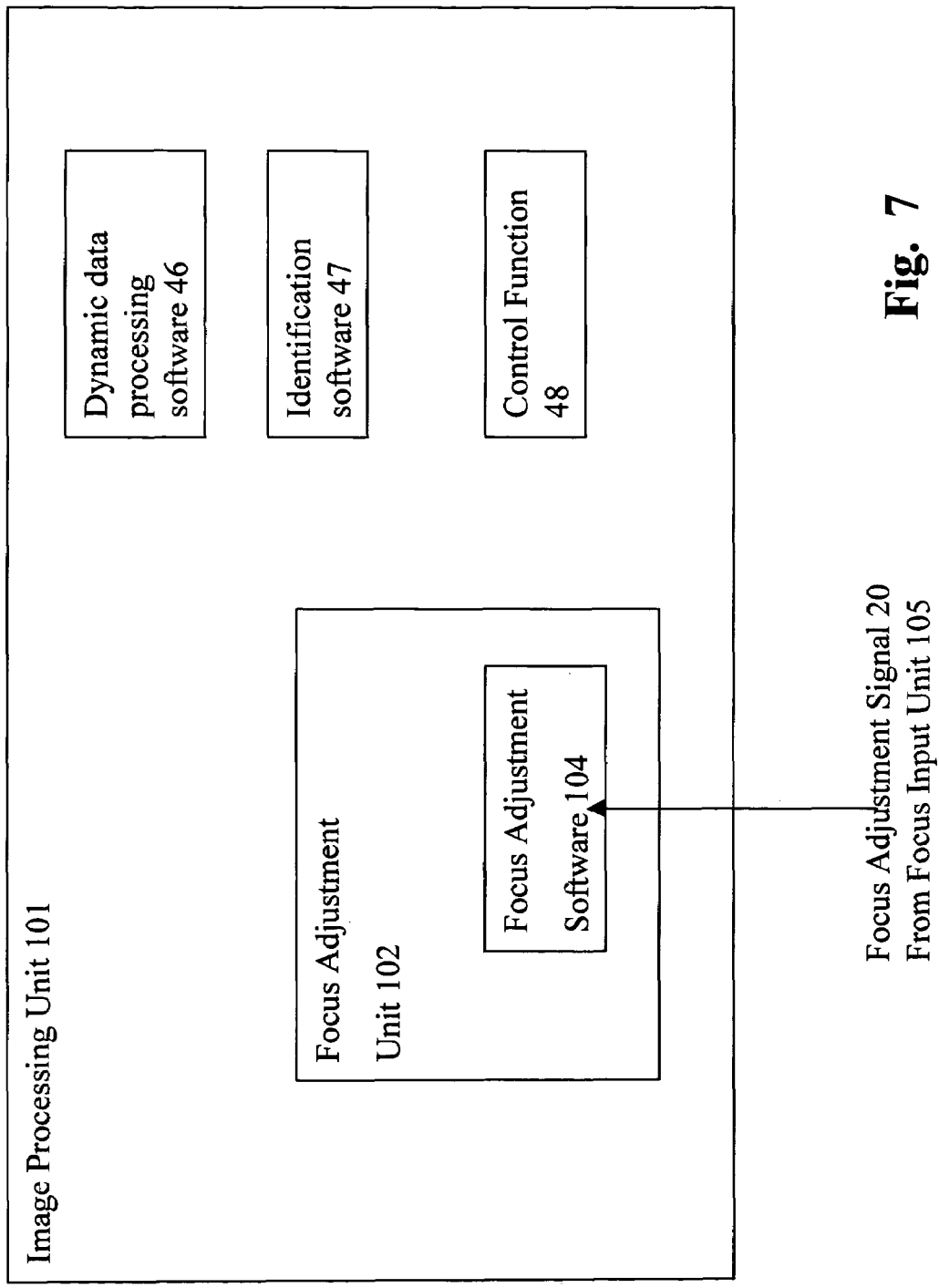
FIG. 7 is another block diagram about the components of the signal processing unit of the present invention.

With reference to FIG. 7, the signal processing unit 101 includes various image processing and data processing software. Thereby, the inputted data can be processed according to the requirement of users.

For example, the signal processing unit 101 has a dynamic data processing software 46 for calculating dynamic data of the objects in the input images, such as distances, speeds, accelerations, etc. of the objects. Furthermore, the signal processing unit 101 may includes an identification software 47 for identifying desired objects in the inputted images.

Moreover, the signal processing unit 101 further includes a control function 108 having functions which are generally included in general video display, such as fast display, slow display, return of the display, searching, election of languages, zoon selections, etc.

Referring to FIG. 2, the present invention can further include an output device 108 for outputting designated data from the signal processing unit 101 by wired connection or wirelessly.

Moreover, in the present invention, the focuses of the two eyes can be adjusted individually so as to match people having different eyesight at two eyes.

In another embodiment of the present invention, the image display unit 103 is a pair of eyeglasses. The lenses of the eyeglasses are both used as a display and a glass. In this embodiment, the button 17 serves for switching the focus adjustable head mounted display system of the present invention. As the button 17 is turned on, the focus adjustable head mounted display system will be actuated so as to actuate the digital content storage unit 100 and thus the image captured from the digital content storage unit 100 is processed and then displayed on the image display unit 103. When the button 17 is turned off, the focus adjustable head mounted display system of the present invention is turned off so that the eyeglasses are used as a normal eyeglass.

In another embodiment of the present invention, all the components are same as those in above said embodiment except that the lenses are replaced on display screens which has no function of eyeglass. Namely, the user only view the image inputted from the digital content storage unit 100.

The present invention is thus described, it will be obvious that the same may be varied in many ways. Such variations are not to be regarded as a departure from the spirit and scope of the present invention, and all such modifications as would be obvious to one skilled in the art are intended to be included within the scope of the following claims.

What is claimed is:

1. A focus adjustable head mounted display system used in a head mounted display device for displaying digital contents comprising:
    a digital content storage unit for storing digital data including audio data and image data;
    a signal processing unit connected to the digital content storage unit for receiving image signals outputted from the digital content storage unit and processing the received image signals;
    a focus adjustment unit included in the signal processing unit for adjusting an input image from the digital content storage unit according an input focus adjustment signal to generate an adjusted display image so that the adjusted display image responses the focus adjustment signal;
    an image display unit connected to the signal processing unit; the image display unit being installed at a head mounted display device for displaying the adjusted display image which is directly viewed by at least one eye of a user wearing the head mounted display; and
    a focus input unit connected to the focus adjustment unit; focus input unit being a manually operation device for generating the focus adjustment signal to the signal processing unit; the focus input unit providing a focus value to the focus adjustment unit.

2. The focus adjustable head mounted display system as claimed in claim 1, wherein the focus adjustment unit includes a focus adjustment software; the focus adjustment software operates the input image so as to get the adjusted display image mapping to the input image with a designated focus from the focus adjustment signal.

3. The focus adjustable head mounted display system as claimed in claim 1, further comprising a sound playing unit for displaying sound from the signal processing unit.

4. The focus adjustable head mounted display system as claimed in claim 3, wherein the sound playing unit is one of a microphone and at least one earphone.

5. The focus adjustable head mounted display system as claimed in claim 1, wherein contents stored in the digital content storage unit include at least one of movies, songs, books, letters, short messages, web pages, notes, programs and recording data.

6. The focus adjustable head mounted display system as claimed in claim 1, further comprising an image capturing device for capturing environmental images which are then processed through the signal processing unit and then displayed on display screens.

7. The focus adjustable head mounted display system as claimed in claim 1, further comprising an input unit for inputted data into the focus adjustable head mounted display system by wired connections or wireless connections.

8. The focus adjustable head mounted display system as claimed in claim 7, wherein the input unit is a wireless device for inputting air transmitted video and audio data so as to act as a television or an radio playing device.

9. The focus adjustable head mounted display system as claimed in claim 7, wherein the input unit is one of a keyboard, a mouse, a compact disk drive, a floppy disk drive and a hard disk driver.

10. The focus adjustable head mounted display system as claimed in claim 1, wherein the input unit is connected to the digital content storage unit for inputting data from the input unit to the signal processing unit for storage.

11. The focus adjustable head mounted display system as claimed in claim 1, wherein the signal processing unit includes a data processing software.

12. The focus adjustable head mounted display system as claimed in claim 1, wherein the signal processing unit include an image processing software.

13. The focus adjustable head mounted display system as claimed in claim 1, wherein the signal processing unit includes a dynamic data processing software for calculating dynamic data of the objects in the input images, the dynamic data includes at least one of distances, speeds, accelerations.

14. The focus adjustable head mounted display system as claimed in claim 1, wherein the signal processing unit includes an identification software for identifying desired objects in the inputted images.

15. The focus adjustable head mounted display system as claimed in claim 1, wherein the signal processing unit includes control units having functions which are generally included in general video display device.

16. The focus adjustable head mounted display system as claimed in claim 15, wherein the functions include at least one of fast display, slow display, returning of the display, searching, election of languages, and zoom selection.

17. The focus adjustable head mounted display system as claimed in claim 1, further comprising an output device for outputting designated data from the signal processing unit by wired connection or wirelessly.

18. A head mounted display device with a focus adjustable head mounted display system for displaying digital contents comprising:
  a casing for containing some elements of the head mounted display device;
  at least one temple piece;
  an digital content storage unit for storing digital data including audio data and image data;
  a signal processing unit connected to the digital content storage unit for receiving image signals from the digital content storage unit and processing the received image signals; signal processing unit comprising a focus adjustment unit; and
  an image display unit connected to the signal processing unit; the image display unit including at least one display screen corresponding to eyes of a user wearing the head mounted display device; and
  a focus input unit connected to the focus adjustment unit for generating a focus adjustment signal to the signal processing unit; and
  the focus input unit providing a focus value to the focus adjustment software.

19. The head mounted display device as claimed in claim 18, further comprising:
  a button for actuating the image focus adjustment signal which give different focus values according to an input from the button.

20. The focus adjustable head mounted display device as claimed in claim 18, further comprising a sound playing unit for displaying sound from the signal processing unit.

21. The focus adjustable head mounted display device as claimed in claim 18, further comprising an image capturing device for capturing environmental images which are then processed through the signal processing unit and then displayed on the displaying screens.

22. The focus adjustable head mounted display device as claimed in claim 18, further comprising an input unit for inputted data into the focus adjustable head mounted display system by wired connections or wireless connections.

23. The focus adjustable head mounted display device as claimed in claim 18, further comprising an output unit for outputting designated data from the signal processing unit by wired connection or wireless connection.

24. The focus adjustable head mounted display device as claimed in claim 18, further comprising at least one buttons having functions selected from at least one of stopping display, adjusting sound quality, adjusting image quality, and turning on or off elements of the device.

25. The focus adjustable head mounted display device as claimed in claim 18, wherein the at least one display screen is used both as a display and a lens.

26. The head mounted display device as claimed in claim 18, wherein the image display unit is a projecting display unit, namely, the display image is generated and then is projected into the display screens so as to get a virtual image viewed by the user.

27. The head mounted display device as claimed in claim 25, wherein the image display unit is a direct display unit; namely, the image is directly input to the lenses so as to present to the user.

28. The head mounted display device as claimed in claim 18, further comprising a button for switching the focus adjustable head mounted display system; wherein as the button is turned on, the focus adjustable head mounted display system will be actuated and the display screen has the function of displaying image; and as the button is turned off, the focus adjustable head mounted display system is turned off so that the display screen is as a lens.

29. The focus adjustable head mounted display device as claimed in claim 18, wherein a focus of each display screen is controlled individually.

30. The focus adjustable head mounted display device as claimed in claim 18, wherein a button is used to generate the focus adjusting signal so as to generate a respective focus value.

* * * * *